US009274694B2

(12) United States Patent
Barraclough et al.

(10) Patent No.: US 9,274,694 B2
(45) Date of Patent: Mar. 1, 2016

(54) DEVICE, SYSTEM AND METHOD FOR IMAGE-BASED CONTENT DELIVERY

(75) Inventors: Keith Barraclough, Mountain View, CA (US); Melanie Larson, Mountain View, CA (US); David Irvine, San Jose, CA (US); Benjamin Luther Phillips, Menlo Park, CA (US); James Nathaniel Gerlach, Sunnyvale, CA (US)

(73) Assignee: Next Issue Media, Menlo Park, CA (US)

( * ) Notice: Subject to any disclaimer, the term of this patent is extended or adjusted under 35 U.S.C. 154(b) by 675 days.

(21) Appl. No.: 13/439,665

(22) Filed: Apr. 4, 2012

(65) Prior Publication Data

US 2012/0297302 A1 Nov. 22, 2012

Related U.S. Application Data

(63) Continuation-in-part of application No. 13/415,157, filed on Mar. 8, 2012.

(60) Provisional application No. 61/487,111, filed on May 17, 2011.

(51) Int. Cl.
| *G06F 3/03* | (2006.01) |
| *G06F 3/0485* | (2013.01) |
| *G06F 17/30* | (2006.01) |

(52) U.S. Cl.
CPC ........ *G06F 3/0485* (2013.01); *G06F 17/30058* (2013.01)

(58) Field of Classification Search
CPC .................... G06F 17/30047; G06F 17/30058
USPC .......................................... 715/716, 764, 810
See application file for complete search history.

(56) References Cited

U.S. PATENT DOCUMENTS

| 6,199,082 | B1 | | 3/2001 | Ferrel et al. |
| 6,574,629 | B1 | * | 6/2003 | Cooke et al. |
| 7,107,549 | B2 | * | 9/2006 | Deaton et al. ................. 715/836 |
| 7,908,358 | B1 | | 3/2011 | Prasad et al. |
| 2002/0035697 | A1 | * | 3/2002 | McCurdy et al. ............. 713/200 |
| 2002/0091739 | A1 | | 7/2002 | Ferlitsch et al. |

(Continued)

FOREIGN PATENT DOCUMENTS

EP 1139253 10/2001

OTHER PUBLICATIONS

Kon, M., et al., "A New Digital Future for Publishers?", Oliver Wyman, Media Entertainment and Leisure, www.oliverwyman.com.

(Continued)

*Primary Examiner* — Amy Ng
*Assistant Examiner* — Meseker Takele
(74) *Attorney, Agent, or Firm* — Crawford Maunu PLLC

(57) ABSTRACT

Media content is provided using thumbnail-based images and respective archives linked thereto. In accordance with one or more embodiments, access is provided to interactive single-page and multi-page thumbnail images, with each thumbnail image being linked to at least one of a plurality of media-content units in respective sets of the media-content units (e.g., to pages within respective articles each having one or more pages, with each page having predefined text and image data in a set layout). Archive data is identified and communicated for each media content unit, responsive to user input data indicating a selection of one of the thumbnail images, and based on availability of the archive data locally at a user device.

23 Claims, 8 Drawing Sheets

(56) References Cited

U.S. PATENT DOCUMENTS

| | | |
|---|---|---|
| 2004/0003351 A1 | 1/2004 | Sommerer et al. |
| 2004/0199527 A1 | 10/2004 | O'Morain et al. |
| 2005/0210412 A1* | 9/2005 | Matthews et al. ............. 715/835 |
| 2006/0048043 A1* | 3/2006 | Kikuchi .................... 715/501.1 |
| 2006/0294051 A1 | 12/2006 | Kapadia et al. |
| 2006/0294578 A1 | 12/2006 | Burke et al. |
| 2007/0070442 A1 | 3/2007 | Ohkubo |
| 2008/0109306 A1 | 5/2008 | Maigret et al. |
| 2009/0030792 A1 | 1/2009 | Khivesara et al. |
| 2009/0138357 A1 | 5/2009 | Riggs |
| 2009/0216623 A1 | 8/2009 | Hendricks et al. |
| 2009/0249217 A1 | 10/2009 | Narayanaswami |
| 2009/0259971 A1 | 10/2009 | Rankins et al. |
| 2009/0319925 A1 | 12/2009 | Katinsky et al. |
| 2010/0094878 A1 | 4/2010 | Soroca et al. |
| 2010/0175090 A1 | 7/2010 | Cordray |
| 2010/0325086 A1 | 12/2010 | Skinner et al. |
| 2011/0080843 A1 | 4/2011 | Casey et al. |
| 2011/0099071 A1 | 4/2011 | Johnson |
| 2011/0169860 A1 | 7/2011 | Ito |
| 2013/0081083 A1* | 3/2013 | Yu et al. ......................... 725/40 |
| 2013/0198602 A1* | 8/2013 | Kokemohr ................... 715/233 |
| 2014/0337322 A1* | 11/2014 | Cho et al. ..................... 707/722 |

OTHER PUBLICATIONS

Chorianopoulos et al. "Cross Media Digital Rights Management for Online Stores" [online]. In: Proceedings of the First Int'l Conference on Automated Production of Cross Media Content for Multi-Channel Distribution 2005.

Sathish. "Delivery Context Access for the Mobile Web" [online]. Dated May 2007. Retrieved at: http://tutkielmat.uta.fi/pdf/lisuri00064.pdf.

EPO Extended Search Report, counterpart European Patent Application No. 13757704.5 (Oct. 16, 2015), 2 pgs.

Story, G. A. et al. "The RightPages Image-Based Electronic Library for Alerting and Browsing," Computer, IEEE, vol. 25, No. 9 (Sep. 1992), pp. 17-25.

* cited by examiner

DEVICE, SYSTEM AND METHOD FOR IMAGE-BASED CONTENT DELIVERY

RELATED PATENT DOCUMENTS

This patent document is a continuation-in-part under 35 U.S.C. §120 of U.S. patent application Ser. No. 13/415,157, entitled "Media Content Device, System and Method" and filed on Mar. 8, 2012, which, along with this patent document, claims the benefit under 35 U.S.C. §119 of U.S. Provisional Patent Application Ser. No. 61/487,111 filed on May 17, 2011; these patent documents are fully incorporated herein by reference.

BACKGROUND

Many media categories, such as music, home video, books, and television, have been substantially impacted by the advent of digital distribution. To date, the availability of free content on the internet has diluted publishers' ability to sell print products. This has contributed to print advertising declines, and online advertising has not made up for the loss. Some industry observers foresee a continuing and inevitable slow decline in revenues, based on value migration to tech players, similar to the decline in other media sectors.

In addition to the above, the ability to provide content in a manner that is scalable, usable and readily valued/attributed has been challenging. For example, media content is provided using a myriad of different delivery approaches, and to end-user devices that vary tremendously from user to user, and also change dramatically over time as technology evolves. Distributing the media content such that the content is available in a readily-accessible manner has also been challenging. For instance, the storage capability of end-user devices such as reader type tablets can be limited. In addition, content delivery over networks can be time consuming and subject to issues relating to one or more network components, bandwidth, network availability and others.

These and other aspects have presented challenges to the delivery, selection and presentation of media content.

SUMMARY

Aspects of the present disclosure are directed to presenting media content to users, such as via mobile (e.g., hand-held) devices, stand-alone computers, mobile computers, televisions and other displays, and navigation systems.

In accordance with one or more embodiments, an apparatus includes first and second circuit-based modules. The first circuit-based module provides access to interactive thumbnail images, with each thumbnail image being linked to at least one of a plurality of media-content units in respective sets of the media-content units, as follows. A single-page thumbnail image is provided for each media-content unit including a single image-based media content page to be displayed at a remote media access device. A multi-page thumbnail image is provided for each media-content unit including at least two image-based media content pages to be displayed at the remote media access device. The single-page thumbnail image includes image data that is based upon an image displayed on the single image-based media content page, and the multi-page thumbnail image includes image data that is based on an image displayed on at least two of the at least two image-based media content pages. Both the single-page and multi-page thumbnail images are of the same display size. The second circuit-based module identifies and communicates archive data for each media content unit in response to user input data provided at the remote media access device and indicating a selection of one of the thumbnail images. Archive data is identified for a media content unit for which the selected thumbnail image is provided, with the identified archive data including at least one of images and text for each media content page in the unit. The identified archive data is communicated to the remote media access device, in response to the identified archive data, including archive data that is not stored in the remote media access device, and to provide access to the identified archive data by a user at the remote media access device.

Other example embodiments are directed to a reader-type device having a display, network communication circuitry and first and second respective circuit-based modules, which may be implemented in accordance with the above discussion. Still other embodiments are directed to a server-side device having first and second circuit-based modules that respectively generate thumbnails and provide access to media content archive data as discussed above.

The above summary is not intended to describe each embodiment or every implementation of the present invention. The figures and detailed description that follow more particularly exemplify various embodiments.

FIGURES

One or more embodiments of the present disclosure may be more completely understood in consideration of the detailed description and in connection with the drawings, in which FIG. 1 shows respective circuit-based apparatuses, in accordance with an example embodiment of the present invention;

Figure 1:
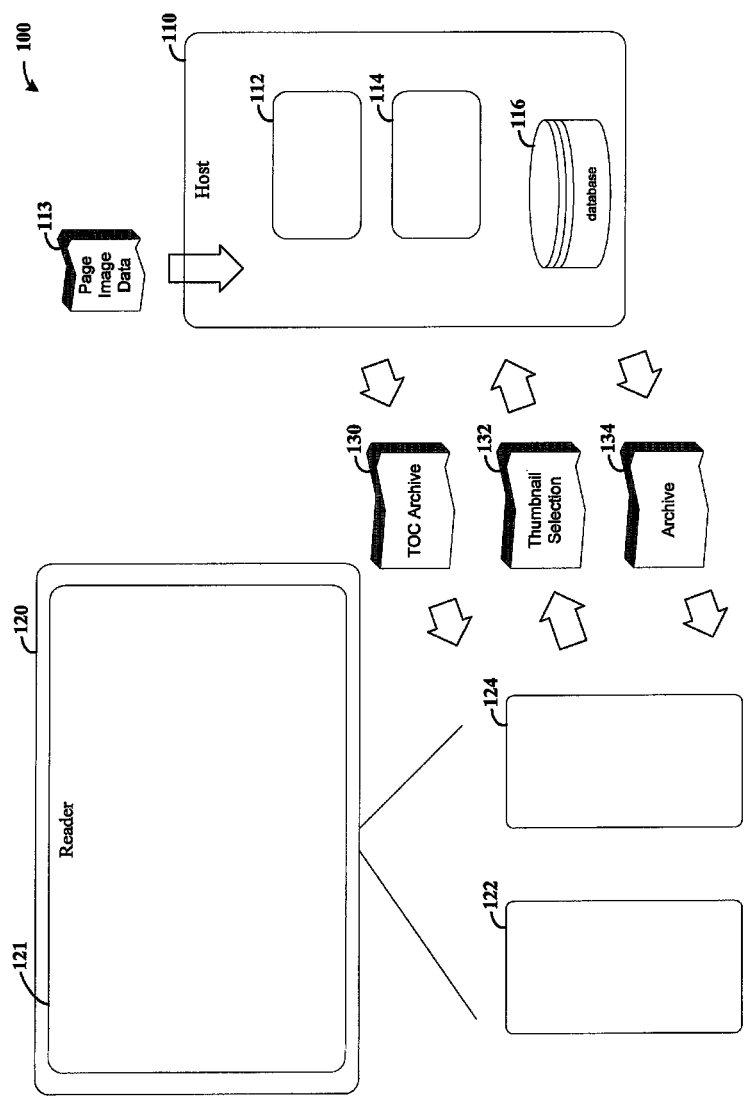

While the disclosure is amenable to various modifications and alternative forms, specifics thereof have been shown by way of example in the drawings. It should be understood, however, that the intention is not to limit the disclosure to the particular embodiments shown and/or described. On the contrary, the intention is to cover all modifications, equivalents, and alternatives falling within the scope of the present disclosure.

DETAILED DESCRIPTION

The present disclosure relates to media content, delivery and presentation, as well as circuits, devices and systems as described herein. While the present disclosure is not necessarily limited, aspects of the disclosure may be appreciated through a discussion of examples using these and other contexts. The following discussion, as well as that in the above-referenced provisional application that is incorporated herein, describes various exemplary embodiments without limitation to other related embodiments and/or subject matter herein.

Various example embodiments are directed to systems, methods and apparatuses (e.g., computer or other circuit-based modules) that facilitate the presentation and delivery of media content for display at a remote user device, such as a tablet or other hand-held device. In some embodiments, these approaches are used to present media content corresponding to a subscription-type access to various pages in a magazine, book or other periodical-type scheme, based on the creation and presentation of size-correlated navigational thumbnail type images and the selective/streaming delivery of corresponding page-based content.

In these contexts, media content may include text and/or images to be displayed on a page-by-page basis using a layout scheme specific to the content type, which is attributed to thumbnail-type images displayed in an arrangement that conveys a logical organization of the respective pages of media content (e.g., represented consecutive pages in an article). Each page may further include embedded content such as video or audio content, and variable content such as may pertain to advertising information. The media content is archived, with each page being associated with one or more archives with data identifying the archive-to-page relationship, and each page also being associated with data specifying a relationship between the page and other pages in a unit, or group such as an article, a periodical or a series of periodicals. For instance, where a particular page belongs to a group of pages that, together, make up an article in a periodical, the group of pages may be implemented as an archive. In addition, where content on pages is shared with different pages and/or completely different articles, periodicals or other grouping, an archive for such content can be attributed to multiple pages. As one such example, an advertising video archive can be linked to multiple pages in different sets of archives.

Delivery of the respective archives is carried out based on user-selections corresponding to respective pages to be displayed. Responsive to a page selection (e.g., a user selecting an entire article, or a user selecting or turning to a single page), appropriate archive information is identified for that page. A determination is made as to whether the archive information is available at the device via which the user is accessing the content. If the archive information is available at the device (e.g., if an entire article has been pre-loaded and a user is simply turning pages within the article), the archive information is immediately displayed. If the archive information is not available at the device, the information is communicated to the device from a remote server, such as via the Internet and/or cellular-type mobile networks.

Various example embodiments are directed apparatuses (e.g., circuit-based modules implemented at computer-type devices) for providing media content as described herein. In some embodiments, such apparatuses are implemented on a server-side and provide media content for respective pages of content to a multitude of users, for a variety of different publishers and related entities. Other embodiments are directed to client-side apparatuses, which operate to communicate with a server-side apparatus for presenting media content in a page-based format to a user. Still other embodiments are directed to systems involving both client-side and server-side circuit modules that may communicate with one another, such as via the Internet, to facilitate the delivery and presentation of media content sourced from a server and displayed at a user's hand-held reader device.

In various implementations, media content as described herein pertains to subscription-type content, as may be associated with one or more of a variety of content sources. Available content types and/or subscription types are provided to users via an interface, from which content can be accessed. Various embodiments are directed to controlling content access and presentation based upon attributes of one or more of a user attempting to access the content, an owner of the content and characteristics of one or more of a device and system used to access the content. In some implementations, the content pertains to a digital or print-type magazine that offers the content to subscribers, who are provided access as discussed herein.

Various embodiments are directed to an apparatus that provides access to interactive thumbnail images, and communicates archive data based on selections of the thumbnail images. Each thumbnail image is linked to one or more media-content units in respective sets of the media-content units, such as a particular page or group of pages in an article, with access being provided to units within the sets based on selections of respective thumbnails. Such access is non-linear, for example, in the context of providing access to different articles within a digital publication, or to different pages within the articles. In addition, such non-linear access facilitates the delivery of portions of media content units, or of a set of media-content units, in a streaming or on-demand type of access approach without necessarily delivering an entire set of media content (e.g., a digital magazine issue) to which an end-user is entitled.

Accordingly, various implementations are directed to creating thumbnail-based images for proprietary digital magazine subscription content having a logical ordering based upon an arrangement of text and/or images within the content. The respective thumbnails pertaining to different articles are digitally linked to a particular article and/or to a particular publisher, based upon subscription access for a user. Archive data is thus digitally linked to the same article and/or publisher. Accordingly, a plurality of thumbnails are displayed, respectively based upon a logical ordering of the thumbnails pertaining to an issue or other media content unit to which the media content pages represented by the thumbnails belong. The thumbnail-based access to the archive data is provided based upon the logical ordering.

Single-page thumbnail images are provided (displayed and/or generated) for each media-content unit including a single image-based media content page to be displayed at remote media access devices, and multi-page thumbnail images are provided for each media-content unit including at least two image-based media content pages to be displayed at the remote media access device. The respective thumbnail images are based on image data on the page(s) represented by the thumbnail images, the multi-page thumbnail images being based on two or more pages, with the thumbnail images also having a common display size. These same-size thumbnail images can be displayed concurrently, providing a visually-pleasing display that facilitates access to different archives based on the selected thumbnail images.

Archive data is identified and communicated for each media content unit in response to user input data provided via the selection of the thumbnail images, and based upon archive data linked to the selected thumbnails. In this context, different (e.g., low-resolution) thumbnails can be selected and implemented to access full-page based archive data for providing text and/or image data corresponding to respective pages in a set of content units. The archive data is communicated for access at the remote media access devices based on the availability of the data thereat.

Accordingly, when a selected thumbnail image corresponds to a media content unit including a single image-based media content page, image and/or text data for the entire media content page is displayed at the remote media device. When a selected thumbnail image is based on two or more image-based media content pages, image and/or text data for one of the pages is displayed (e.g., a first page of an article), and image and/or text data for a sequential one of the pages is displayed in response to a further user input. The archive data is identified, in various embodiments, using ID data identifying the selected thumbnail image together with stored mapping data that correlates the ID data with at least one archive.

Various embodiments are directed to a pre-loading, or predictive type of media content access. Additional archive data is communicated in response to communicating the identified archive data to the remote media access device, and use thereof. This approach can be implemented, for example, by determining that a user is accessing a last page in a particular archive, and communicating an archive including a next page as may be accessed by the user, and can be effected by a monitoring-type application available at a reader device.

Another example embodiment is directed to selecting one of at least two sets of archive data for which a common thumbnail image is provided, based upon one or more conditions. For example, available bandwidth for communicating the archive data, a device type identification of the remote media access device to which the archive data is to be communicated, and a page orientation for providing the identified archive data for access at the remote media access device can all be used to identify an appropriate version of archive data to deliver.

Another example embodiment is directed to a reader-type device having a display, network communication circuitry and first and second respective circuit-based modules, which may be implemented in accordance with the above discussion. The reader-type device is responsive to user inputs selecting displayed thumbnails by displaying archive data that is either available locally, or accessed remotely, the latter being carried out responsive to the archive data not being locally available. With this approach, streaming-type non-linear access can be provided to respective media content pages at the reader device, by delivering the pages on a page-by-page or article-by-article approach without necessarily delivering an entire set of articles (e.g., pertaining to a digital magazine).

In another embodiment, a server-side device has first and second circuit-based modules that respectively generate thumbnails and provide access to media content archive data, as may be implemented with the above discussion. The server-side device generates thumbnails image data, and communicates archive data based upon user selections of the thumbnail image data. In various aspects, different sets of archive data, including information to be displayed on at least one page for each article in a single issue of a digital magazine, are separately communicated upon an article-by article basis. In addition, access to the respective sets of media content units is controlled in connection with various embodiments, by communicating the generated thumbnail images over a network using authentication criteria provided by the remote media access devices, and data linking the media content units to the thumbnail images. In other embodiments, the communication of the identified archive data is controlled by processing authentication criteria communicated from the remote media access devices with stored authentication data.

Navigation between media content pages is effected using one or more of a variety of approaches. In one example embodiment, navigation between pages represented in a content unit (e.g., a magazine article) is based upon a (logical) vertical user input at a reader device for scrolling or jumping vertically through an article. Navigation between different content units is based upon a (logical) horizontal user input at a reader device, for scrolling or jumping horizontally between different content units respectively having different sets of media content pages. Accordingly, archives tied to respective media content pages are provided at the reader device based upon the user inputs, with archive data communicated to the reader device when the archive data is not available at the reader device.

In some implementations, horizontal navigation between respective contents units is restricted when a user is vertically navigating within a particular content unit. In one example, when a user is scrolling vertically through several pages of an article, horizontal navigation to a subsequent article is limited to instances in which the user is at a top-level (e.g., first or main page) within the particular article. In other embodiments, a page or article link is provided within respective article pages, such that a user input with regard to such a link is processed by retrieving and presenting archive data corresponding to the particular pager or article to which the user input applies (e.g., for navigating to other articles or pages within a particular magazine issue, or between magazine issues).

In various implementations, thumbnail images as presented above correspond to a table of contents (TOC) for a particular issue or other set of media content units, with each thumbnail being attributed to one or more media content archives for each unit. The table of contents is a user interface component that is displayed to the user, such as in response to a specific type user interaction with the controlling application/module at a user's reader device. The TOC may contain an entry for each article and section in a particular issue, or in a group of articles set in accordance with user preferences. When the user selects an article or section from the TOC, the TOC user interface component closes (e.g., terminates operation) and the reader navigates to the first page of the selected section or article. Such an approach may be implemented, for example, in accordance with FIGS. 4A-4D as discussed below.

Alternate views are provided to suit particular applications, which can be initiated after a media content page has been selected for navigation. In some implementations, a browsing view is presented in which a particular media content page is presented along with navigation tools for navigating to other content pages and/or other articles, or back to a table of contents type of view in which respective thumbnail images are provided as discussed herein.

Source content that is used to develop archives to which respective thumbnails and media content pages refer is provided in one or more of a variety of manners to suit various example embodiments. In one example embodiment, source content received in different formats is converted to a common format for use in thumbnail generation and display. Graphical elements are selectively resealed and/or resampled to meet characteristics of specific devices upon which an end reader application is running, for providing image-based access to the source content. For each page, a small dimensioned, composite image is selected, with interactive elements being combined to create a view of the page as it would be rendered in an end-user reader application. Such a composite image, or thumbnail, is thus representative of the page with respect to a user's viewing, but with a much smaller data size. In some implementations, different browse images are constructed for portrait and landscape orientations, respectively having different dimensions and constructed based upon different aspects of the source content with respect to each orientation (portrait and landscape).

The source content is then factored into individual archives, with each archive including resources (data) necessary for rendering a particular unit of content. Such a unit of content may include, for example, a single orientation of a single page, multiple orientations of a single page, all of the pages of an article or other logical grouping of content.

Archive data for each respective media content page to be displayed at an end user device is communicated using one or more of a variety of approaches, depending upon the application. These approaches may include user-initiated download communications and/or background download communications. For instance, a reader application at an end-user device initially has no content locally available to it. When the user initiates a reading content activity, the reader downloads one or more archives containing the description of the structure of the content to which the user is seeking access. For instance, a user may select access to a magazine to which the user has subscription rights.

The structure description includes information for mapping assets to archives that, in conjunction with other data in the description, allows the reader application to determine which archives are required to be downloaded before each particular media content page can be rendered. This process is performed when the reader application is required to render a page. With this approach, efficient, non-linear navigation of the media content is provided, without having to have the entire content set downloaded.

For background-type downloads, media content is downloaded automatically, without necessarily being implemented directly in response to user navigation events. For instance, such an approach may be implemented by downloading archives pertaining to successive pages in an article or issue, when a user selects a single page, in anticipation of the user accessing a logically "next" page or article. Another approach involves a predictive approach to downloading archives to pages that a user is expected to visit, based upon the user's historical content access approaches.

Turning now to the figures, FIG. 1 shows a system 100 and respective server-based and client-based circuit-based apparatuses 110 and 120, in accordance with one or more example embodiments of the present invention. Various embodiments are directed to an entire system 100 that may include one or more server-based apparatuses 110 and client-based apparatuses 120. Other embodiments are directed to a client-based apparatus 110, and still other embodiments are directed to a server-based apparatus 110 (or two or more of such apparatuses working together, or aspects of the apparatus 110 implemented at different locations).

Beginning with the server-based apparatus 110, first and second circuit-based modules 112 and 114 respectively generate thumbnail-based image data corresponding to media content, and provide archive data pertaining to the thumbnail-based image data. The thumbnail data is generated at module 112 using, for example, one or more approaches as discussed herein and in which a thumbnail is created/used for each media content unit, for respective sets of such units. This approach may involve, for example, generating thumbnail images for each article unit in a set of such articles that make up a magazine-type periodical. Each thumbnail image is identified in association with the archive data for the article.

The module 112 generates a single-page thumbnail image for each media-content unit including a single image-based media content page to be displayed at the client-based apparatus 120 (or another a remote media access device). The module 112 generates a multi-page thumbnail image for articles having two or more pages to be displayed at the remote media access device. The single-page thumbnail represents image data that is based upon image data displayed on the single page (e.g., a low-resolution image of an actual page 113 for which archive data is attributed to the thumbnail), and the multi-page thumbnail image similarly represents image data from a main or first page of such an article, as well as an indication of other pages in the article.

The second circuit-based module 114 provides generated thumbnail-type image data representing a table of contents type of archive data 130. In response to thumbnail selection data 132 pertaining to user input data at the client-based apparatus 120, the second circuit-based module identifies archive data, as may be stored in database 116, which is designated to a media content unit for which the selected thumbnail image is provided. The identified archive data is sent as data 134 to the client-based apparatus 120. As discussed herein, the identified archive data includes at least one of images and text for each media content page in the unit, and may include embedded information.

The client-based apparatus 120 includes a reader-type display 121 for displaying page-based media content, as well as circuit-based modules 122 and 124 that facilitate the selection and implementation of the page-based media content. The client-based apparatus 120 also includes communication circuitry for communicating with the server-based apparatus 110, such as a wireless internet circuit and/or cellular communications circuit. The first circuit-based module 122 provides thumbnail-based images, such as TOC-based images from the TOC archive data 130 communicated from the server-based apparatus 110 as discussed above, for access via the display 121. The second circuit-based module 124 is responsive to thumbnail selections via the display 121 by providing appropriate archive data, which can be retrieved from the server-based apparatus 120 by communicating the thumbnail selection data 132, and receiving the archive data 134. With this approach, streaming-type access is provided to sets of media content pages, as may be provided under a common subscription (for pages within a particular article).

In some implementations, the server-based apparatus 110 keeps track of archive data stored at the client-based apparatus 120. When the thumbnail selection data 132 is received, the server-based circuit 110 determines whether data identified in the thumbnail selection data is present at the client-based apparatus 120. For archive data that is already present, the server-based circuit 110 does not communicate the archive data, which can be useful to limit communication bandwidth and time.

In other implementations, the client-based apparatus 120 generates the thumbnail selection data 132 by generating request data for archives that are not present at the client-based apparatus. For instance, where a particular set of pages, content information or other information has already been provided to the client-based apparatus, the apparatus compares available information with information attributed to archives to which selected thumbnail images pertain. The apparatus determines whether any of the archive information is not present at the client-based apparatus 120, and sends the thumbnail-based selection data 132 based on the determination (e.g., with the thumbnail-based selection data 132 being indicative only of that archive and/or specific data within an archive needed at the client-based apparatus 120 for displaying a selected media content page).

In some embodiments, the client-based apparatus 120 monitors available storage space, or storage space attributed to subscription-type content, and selectively deletes content to make room for storing archives as they are received. In this context, the apparatus 120 may set a relatively small amount of storage space aside, using the selective archive retrieval to access content as a user requests/selects the access.

In some implementations, the server-side apparatus 110 includes an authentication module, as may be implemented with the second circuit-based module 114 or otherwise within the apparatus 110. The authentication module authenticates the client-based apparatus 120 for receiving archives, before communicating the archives for access thereat.

Figure 2:
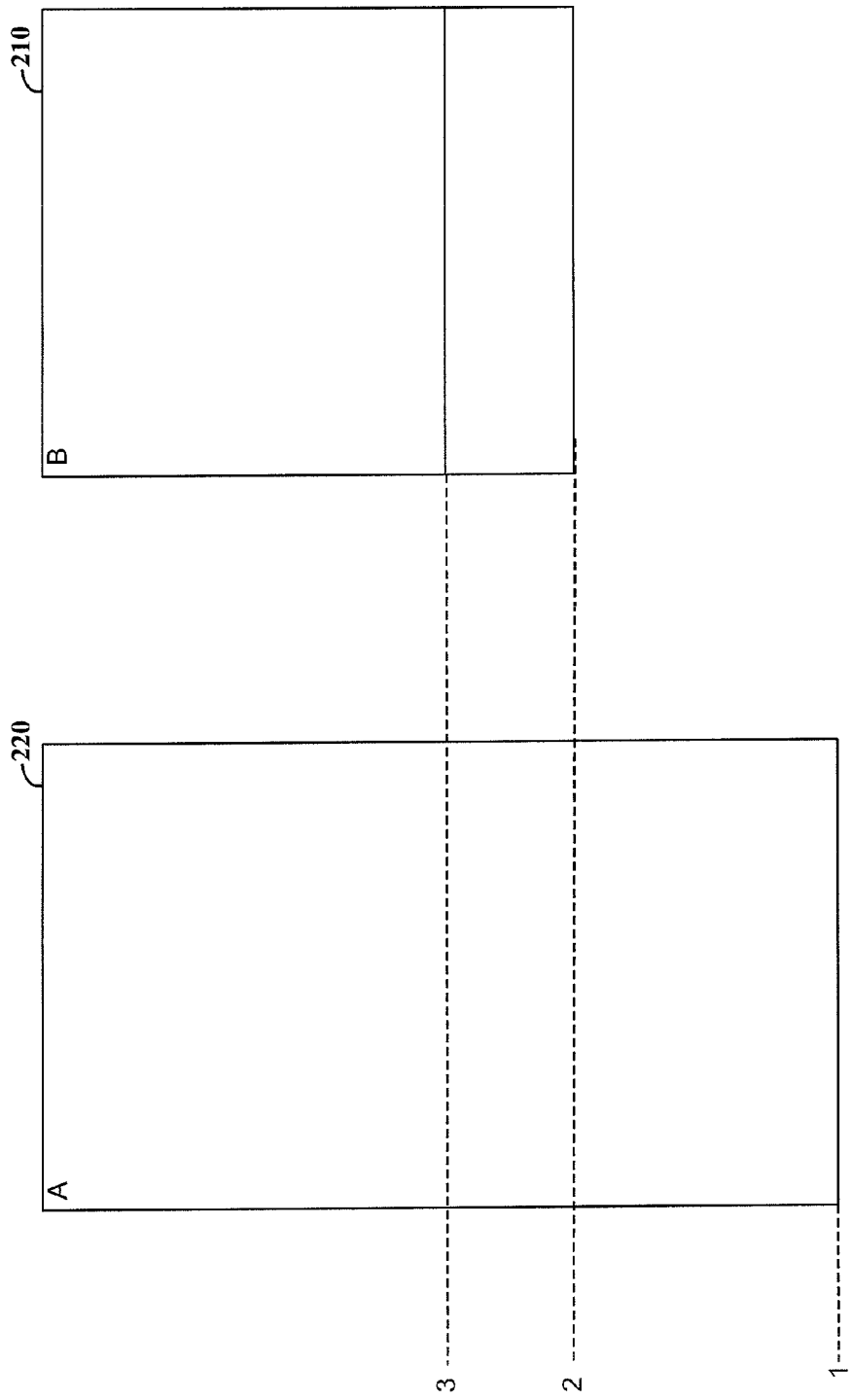
FIG. 2 shows a thumbnail creation approach, in accordance with other example embodiments of the present invention.

Various other embodiments, as may be implemented in connection with FIG. 1 and/or other embodiments as described herein, may involve one or more aspects as described in U.S. patent application Ser. No. 13/415,157 referenced above and to which benefit is claimed. For instance, various embodiments are directed to the presentation of archive data in accordance with event monitoring and related metric valuation as shown in and described in connection with FIG. 1 in the '157 patent document. Other embodiments are directed to the presentation of thumbnail-type images in accordance with one or more approaches as shown in FIG. 2 and described in connection therewith (e.g., as presented with device 202).

A variety of different types of thumbnails are created and used in accordance with various example embodiments. FIG. 2 shows two such thumbnails representing a thumbnail creation approach, in accordance with other example embodiments of the present invention. Browse thumbnail 210 is a single-page thumbnail created by scaling an image representing text, images and/or other information on a media content page, to an appropriate size. This scaling can be implemented, for example, while preserving an original aspect ratio.

Browse thumbnail 220 is a thumbnail corresponding to a media content page having a larger relative height or aspect ratio as relative to browse thumbnail 210, and/or to a multi-page thumbnail. For instance, when a media content page, such as a page of a magazine article, is presented in HTML, the HTML is rendered and a raster image is created and used as a source image for the browse thumbnail. If the resulting browse thumbnail is taller than some value appropriate for the orientation, the browse thumbnail is first cropped and an opacity gradient is applied to the bottom of the image. For instance, the browse thumbnail 220 is cut from a height represented by line 1, to a height represented at line 2. The portion between lines 2 and 3 is a fade portion, which provides a visual cue to the user that there is more content than is displayed in the browse thumbnail. Cropping the browse thumbnail allows it to look visually pleasing next to browse thumbnails that did not require cropping. The additional content represented via the fade may, for example, pertain to a cropped portion of a single image. The fade portion may also represent additional pages within a particular article, or such pages may be similarly displayed (and cropped, if need be), in a vertical-type spatial arrangement as discussed herein. Moreover, the browse thumbnail 210 may also be cropped in the fade region between lines 1 and 2, such as to suit a particular pre-set thumbnail height.

Figure 3:
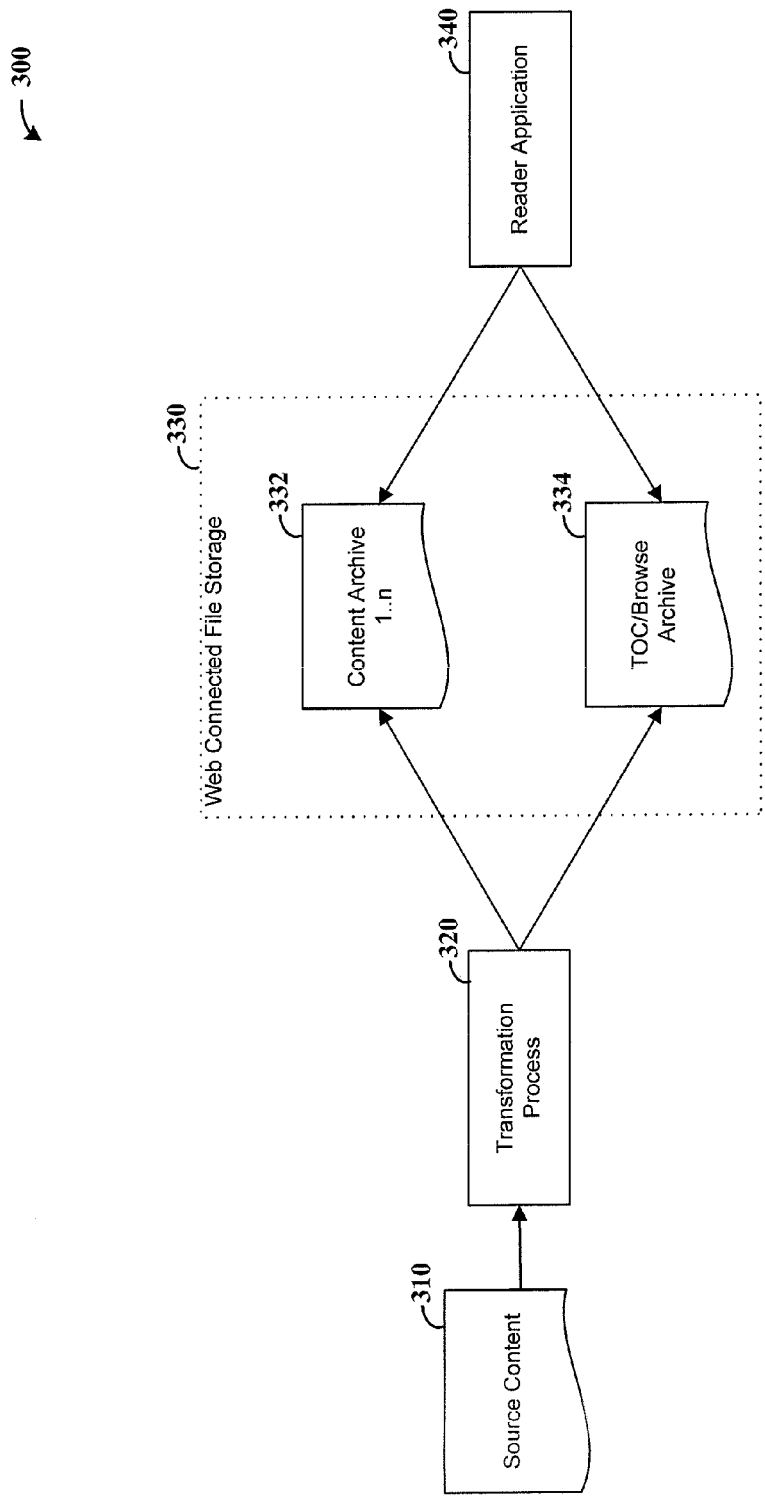
FIG. 3 shows a content management and presentation system and approach, in accordance with another example embodiment of the present invention.

FIG. 3 shows a content management and presentation system 300 and approach, in accordance with another example embodiment of the present invention. The approach shown in FIG. 3 may, for example, be implemented in connection with the system 100 shown in FIG. 1, with the server-based apparatus 110, and/or with the client-based apparatus 120.

At block 310, source content is accessed and transformed at block 320 into a format that is amenable to presentation at reader application 340, such as may be implemented as a circuit-based module in the client-based apparatus 120. The source content is provided in one of many formats, and in some implementations includes, for a single complete issue of a title (e.g., an issue of a particular digital magazine), visual assets, a description of the logical structure of the issue, and data for interactive components of the issue. In some embodiments, metadata for the issue is provided within the source content or as an additional input to the transformation process.

The source content is processed using a transformation process at block 320 that normalizes different source formats into a single format, such that media content provided from different publishers can be displayed in a similar manner. In addition, the block 320 generates browse thumbnail images using an approach such as described herein, as well as a table of contents structure.

The resulting content is then packaged into a collection of information that can be implemented at a web-connected file storage system 330 as one or more archives 332, such as described herein. The table of contents structure is also implemented as an archive 334 in the system 330, such as by storing data pertaining to a table of contents archive for each issue processed at block 320. Each archive contains a portion of a particular issue, and may include portions pertaining to different issues (e.g., where an image or video content such as an advertisement is shared with different issues, each issue may point to the same archive). This allows for individual portions of the issue to be communicated to the reader application 340. One or more algorithms may be implemented to break the content into archives, such as by using one archive per page, one archive per section, or one archive per article.

FIGS. 4A-4D show respective steps/scenarios in a more particular content selection and presentation approach, in accordance with other example embodiments of the present invention. At FIG. 4A, horizontal and vertical page layout images are shown respectively corresponding to articles and pages within each article in a publication. In this instance, the issue includes 9 pages, with pages 1, 2, 5, 7, and 8 being the first page of different sections of the publication (or articles within the publication) and pages 3, 4, 6, and 9 are articles within a section (or pages within a particular article). In some implementations, a browse thumbnail is constructed for each page in the top horizontal axis in a manner similar to that shown in FIG. 2, such that five browse thumbnails are created for the publication represented in FIG. 4A.

Data is communicated from each thumbnails (e.g., as a navigation selection) to a remote device 410, such as described in connection with FIG. 1. This data provides sufficient information to identify archive data as discussed herein, for presenting the data for access by a user.

Figure 4A:
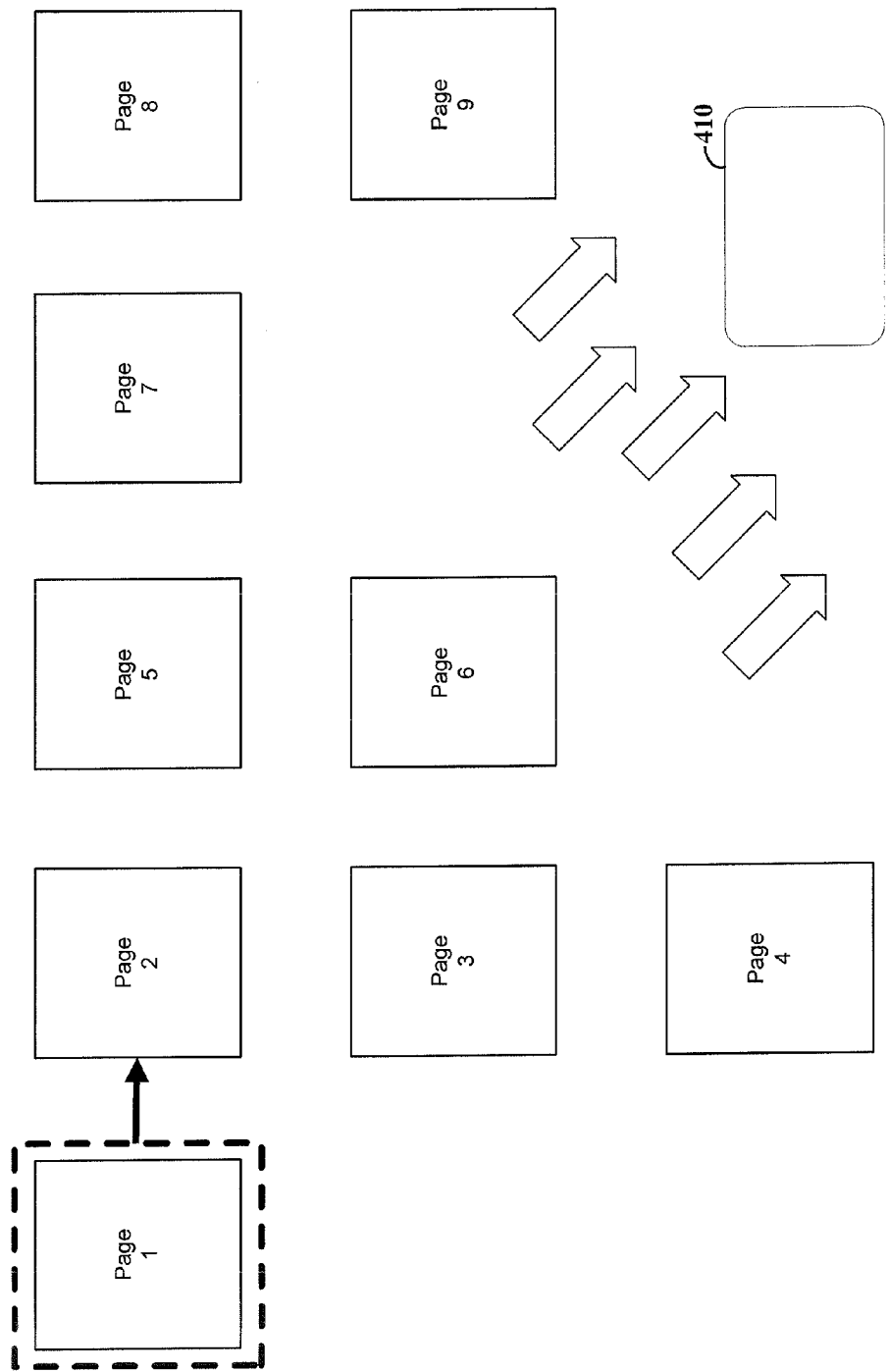
FIGS. 4A-4D show respective steps/scenarios in a content selection and presentation approach, in accordance with another example embodiment of the present invention.
Figure 4B:
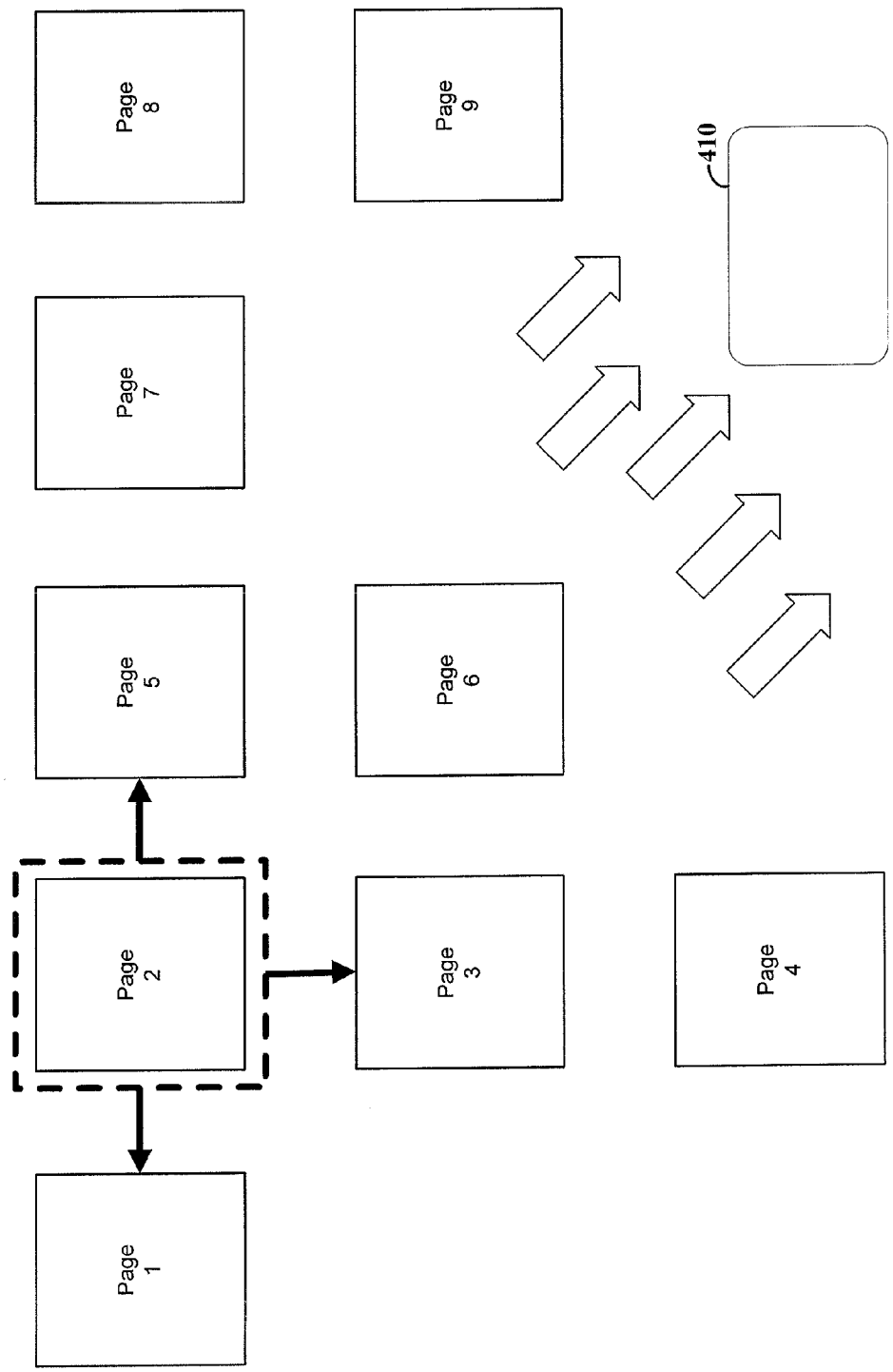
Figure 4C:
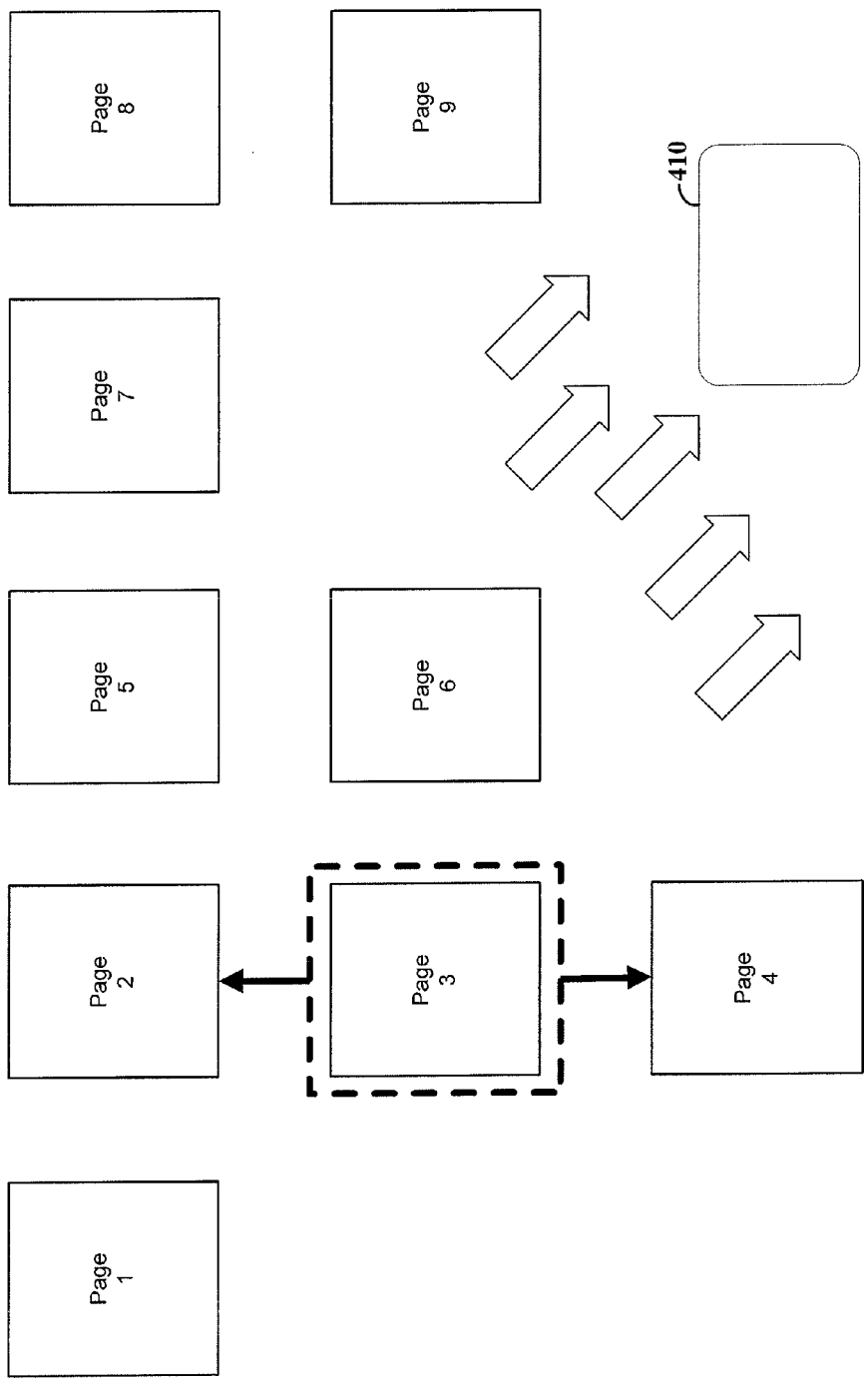
Figure 4D:
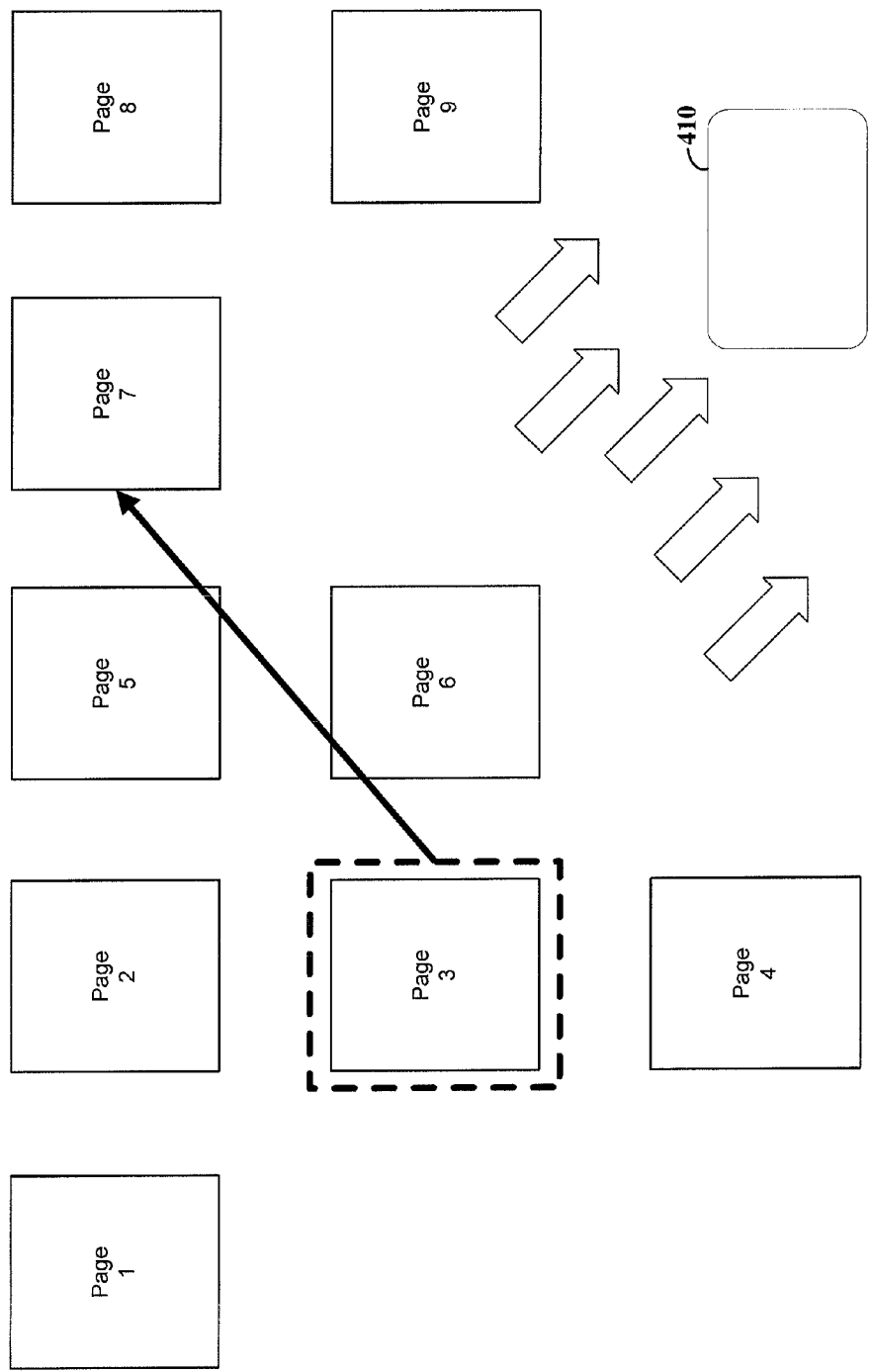

In FIG. 4A, dashed lines and an arrow at page 1 represents a user navigating horizontally to page 2. Once at page 2, the user is able to navigate horizontally back to page 1 or forward to page 3, as shown in FIG. 4B. As also shown at FIG. 4B, the user is also able to navigate vertically to page 3 (and subsequently, to page 4). FIG. 4C shows dashed lines about page 3, representing the user's ability to navigate vertically between pages 2 and 4. In some implementations, once a user has traversed down a vertical axis, access is limited to vertical navigation, until the top page (page 2) is again reached. As shown in FIG. 4D, and in accordance with certain embodiments, direct navigation is provided within particular pages, to other pages, such as when articles within a publication refer to other articles therein.

Figure 5:
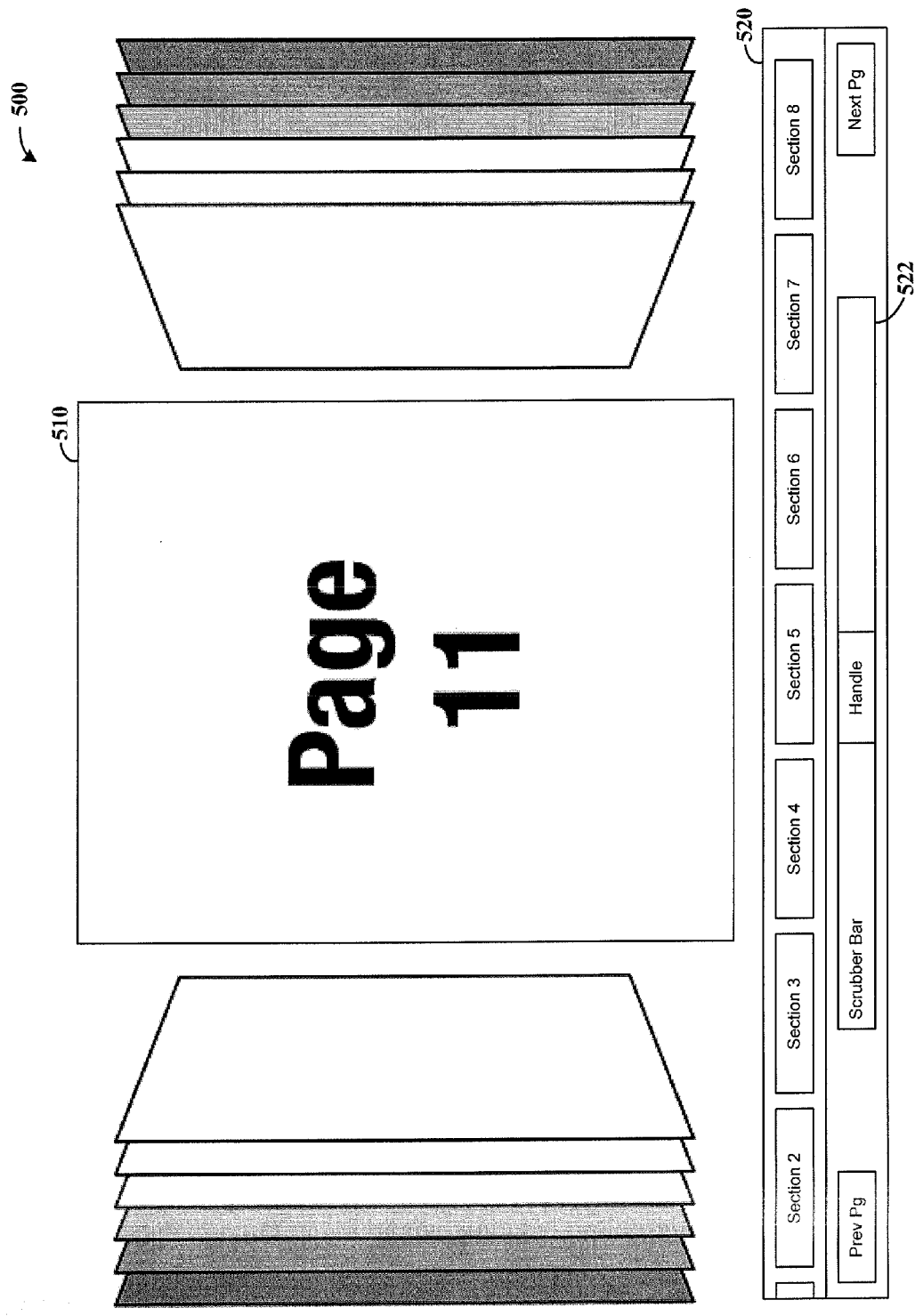
FIG. 5 shows a browse-type view that may be implemented with thumbnail images as described herein, in accordance with one or more other example embodiments of the present invention.

FIG. 5 shows a browse-type view/module 500 that may be implemented with thumbnail images as described herein, in accordance with one or more other example embodiments of the present invention. Such a view may be implemented using, for example, a reader device 120, with each thumbnail image representing a scaled-down image of a page that a user wishes to view. Such a view can be displayed to a user in response to a specific user initiated action, such as by clicking on a specific button, etc.

A thumbnail 510 is displayed for a current page, with additional thumbnails being displayed as a user browses backwards (left) or forward (right) in a particular article. Each thumbnail is created as discussed herein, and can represent a low-resolution image of a media content page having greater resolution/higher bandwidth materials, such as text, images and/or other embedded content. For instance, the browse view shown in FIG. 5 can be used to display a thumbnail for each page that can be navigated to horizontally, allowing a user to quickly flip through the pages and identify a sought-after page accordingly. Once a desired page is identified, the user can navigate to the page by tapping/clicking on the thumbnail. For instance, by tapping/clicking (or otherwise selecting) page 11 in thumbnail 510 as shown, the reader closes the browse view, retrieves appropriate archive data for page 11, and displays the archive data on the reader. In some implementations, page metadata is displayed along with the thumbnail image 510, such as to indicate an article name, issue name or other aspect of the page. Additional navigation aspects may be implemented with the browse view, such as navigation or scroll bars, section headings, navigation tools for jumping to other sections or to a table of contents, and others. One particular embodiment is implemented in accordance with a navigation module that displays information in a navigation bar 520. In connection with one or more aspects (and as may relate to one or more discoveries as described herein), the navigation bar 520 provides a visual cue that facilitates a perception of organizational depth into a particular publication. For instance, the digital presentation of a page within a magazine may suffer from an inability to convey a logical position of the page within an article, issue or volume. As related to a user-interactive experience with a physical publication, viewing page-by-page views within a publication upon a reader device (screen) is modified using the navigation bar 520 to convey such a depth or position within the publication.

By way of example, the navigation bar 520 is shown as displaying a current section pertaining to the page 11 (510), the current section (5) being centered on the bar 520. As a user navigates from page to page, the displayed sections move/scroll to maintain a consistent indication of where a user logically resides in a publication. In various implementations, the module operates responsive to the selection of the different sections via user input, by navigating to the selected section.

By way of another example, the navigation bar 520 is shown displaying a scrubber bar 522, which shows an overall position of the user with respect to a current page (510) and an entire issue. In some embodiments, the scrubber bar and/or the section references also show relative position from a publication date standpoint, to convey a user's position within a volume of different publications (e.g., issues) released at different times. These embodiments are facilitated by the thumbnail image creation and archive linking/retrieval, and in particular for implementation on mobile devices with respect to available storage and bandwidth.

Still other embodiments are directed to the presentation of a browse view with an option to access a full page to which the thumbnail pertains under limited bandwidth conditions, such as by retrieving text only archive data under low bandwidth conditions, to facilitate rapid access to the content. In still other implementations, such text-only archive data is immediately delivered to the reader, with other higher-bandwidth data (e.g., images, video) delivered after the text-only archive data.

Various embodiments as presented herein may be implemented in accordance with one or more apparatuses, systems, methods and other approaches as described and/or shown in the above-referenced provisional patent application, to which priority is claimed. For example, various embodiments are directed to manipulating and presenting media content that may be implemented with the system shown in FIG. 1 of the above-referenced provisional patent application, with regard to the presentation of media content for access and coordinating the delivery thereof. For instance, the various functional blocks may be implemented as software modules executed on one or more networked processors, or implemented on separate processors respectively carrying out different functions (e.g., different processors on a network and/or with processors in an end device operated by a user for accessing content). Data flow between functional blocks may be effected in various manners as well.

In addition, various aspects as shown in FIG. 1 of the above-referenced provisional application may be implemented using one or more approaches as described herein, such as shown in the figures. For instance, media content delivery can be provided as described (e.g., software and service). Other aspects of the system shown in FIG. 1 of the provisional application may be implemented for modules related to those discussed herein, in connection with the presentation and navigation of content.

Various modules may be implemented to carry out one or more of the operations and activities described herein and/or shown in the figures. In these contexts, a "module" is a circuit that carries out one or more of these or related operations/activities. For example, in certain of the above-discussed embodiments, one or more modules are discrete logic circuits or programmable logic circuits configured and arranged for implementing the operations/activities, as described above and shown in FIG. 1 for the circuit blocks 122 and 124 implemented as two modules or combined as one module, or for circuit blocks 112 and 114 (similarly alone or combined), and which cannot be carried out by a human. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having instructions stored thereon which may be executed by a computer (or other electronic device) to perform these operations/activities.

DETAILED-EMBODIMENTS/EXPERIMENTAL

In accordance with various example embodiments, one or more types of computers, mobile devices, tablets, televisions, compute servers, network devices and other electronic devices are used to implement one or more aspects of the various embodiments described herein. For example, in one embodiment, a reader-type device such as a tablet is implemented using a tablet product available from Amazon of Seattle, Wash., and a platform such as the Android Gingerbread platform available from Google of Mountain View, Calif. Such a device may communicate with a host server via the internet, using one or more of Wi-Fi, Ethernet, and mobile cellular types of network communications links.

In connection with various example embodiments, it has been discovered that the presentation of page-based media content, such as may be associated with a digital publication (e.g., magazine issue, and series of such issues), is difficult to comprehend with respect to the depth into a particular magazine issue or to chronological releases of the respective information, such as may be relevant to time-related media content (e.g., news and current events). In connection with these aspects, it has also been discovered that, by displaying thumbnails as described in connection with one or more embodiments herein, and linking those thumbnails with archive data, this can facilitate user comprehension of a logical arrangement and layout of an article, an issue or a series of issues of a publication, which cannot be readily conveyed via the simple presentation of page-based views. In addition, it has further been discovered that, by linking archive data to a lower-resolution thumbnail image, a browse view can be presented with rapid access (via relatively low bandwidth) yet convey sufficient information for comprehension by a user with respect to layout, while also mitigating the requirement that large volumes of data (e.g., for an entire issue) be communicated and/or stored at a user's device, which can negatively affect available storage. This approach facilitates nearly streaming-type access to publication-based digital media, which alleviates the need for delivering an entire volume or media content.

Various embodiments described above, in the above-cited provisional patent application (including the Appendix therein) to which benefit is claimed, and shown in the figures may be implemented together and/or in other manners. One or more of the items depicted in the drawings/figures can also be implemented in a more separated or integrated manner, or removed and/or rendered as inoperable in certain cases, as is useful in accordance with particular applications. For instance, various functions can be carried out by controlling a remote device, such as by controlling a remote end-user device to present media and/or to present representations of the media for input/selection. In view of the description herein, those skilled in the art will recognize that many changes may be made thereto without departing from the spirit and scope of the present disclosure.

What is claimed is:

1. An apparatus comprising:
a first circuit-based module configured and arranged to provide access to interactive thumbnail images, each thumbnail image being linked to at least one of a plurality of media-content units in respective sets of the media-content units, by
providing a single-page thumbnail image for each media-content unit including a single image-based media content page to be displayed at a remote media access device, the single-page thumbnail image including image data that is based upon an image displayed on the single image-based media content page, and
providing a multi-page thumbnail image for each media-content unit including at least two image-based media content pages to be displayed at the remote media access device, the multi-page thumbnail image including image data that is based on an image displayed on at least two of the at least two image-based media content pages, the single-page and multi-page thumbnail images being of a same display size; and
a second circuit-based module configured and arranged to identify and communicate archive data for each media content unit by, in response to user input data provided at the remote media access device, the user input data and indicating a selection of one of the thumbnail images,
identifying archive data designated to a media content unit for which the selected thumbnail image is provided, the identified archive data including at least one of images and text for each media content page in the unit,
communicating the identified archive data to the remote media access device, in response to the identified archive data including archive data that is not stored in the remote media access device, and providing the identified archive data for access by a user at the remote media access device.

2. The apparatus of claim 1, wherein the first circuit-based module is configured and arranged to
provide the single-page thumbnail image by generating the single-page thumbnail image using image data displayed on the single page, and
provide the multi-page thumbnail image by generating the multi-page thumbnail image using image data displayed on at least two of the at least two pages.

3. The apparatus of claim 1, wherein the first circuit-based module is configured and arranged to provide the single-page and multi-page thumbnail images by communicating and concurrently displaying the images on a display at the remote media access device.

4. The apparatus of claim 1, wherein
the first circuit-based module is configured and arranged to provide the single-page and multi-page thumbnail images by communicating and concurrently displaying the thumbnail images on a display at the remote media access device, and
the second circuit-based module is configured and arranged to provide the identified archive data for access by a user by displaying the archive data for at least one of the media content pages in the media content unit for the selected thumbnail image on the display at the remote media access device.

5. The apparatus of claim 1, wherein
the first circuit-based module is configured and arranged to provide the single-page and multi-page thumbnail images by communicating and concurrently displaying the thumbnail images on a display at the remote media access device, and
the second circuit-based module is configured and arranged to provide the identified archive data for access by a user by
in response to the selected thumbnail image corresponding to a media content unit including a single image-based media content page, displaying at least one of image data and text data for an entire media content page on the display at the remote media device, and
in response to the selected thumbnail image corresponding to a media content unit including at least two image-based media content pages, displaying at least one of image data and text data for an entire first one of the at least two image-based media content pages at the remote media device, and in response to a user input for accessing another one of the at least two image-based media content pages, displaying at least one of image data and text data for the entire other one of the at least two image-based media content pages.

6. The apparatus of claim 1, wherein the second circuit-based module is configured and arranged to communicate the identified archive data by transmitting archive data over a network to the remote media access device.

7. The apparatus of claim 1, wherein the second circuit-based module is configured and arranged to communicate the identified archive data by communicating, over a network, an archive request identifying the identified archive data and by receiving, over the network, the identified archive data from a remote archive data source.

8. The apparatus of claim 7, wherein
the second circuit-based module is configured and arranged to determine whether archive data in the request is available at the remote media access device based on archive data that has been communicated to the remote media access device, and
the second circuit-based module is configured and arranged to communicate the archive request in response to determining that archive data in the request is not available at the remote media access device.

9. The apparatus of claim 1, wherein the second circuit-based module is configured and arranged to
identify archive data designated to a media content unit for which the selected thumbnail image is provided by using ID data identifying the selected thumbnail image together with stored mapping data that correlates the ID data with at least one archive, and
communicate data in the at least one archive over a network to the remote media access device.

10. The apparatus of claim 1,
further including an third circuit-based module configured and arranged to authenticate remote media access devices by processing authentication criteria communicated from the remote media access devices with stored authentication data, and
wherein the second circuit-based module is configured and arranged to communicate and provide the identified archive data for access based on the authentication of the remote media access device to which the identified archive data is to be delivered.

11. The apparatus of claim 1, wherein the second circuit-based module is configured and arranged to communicate additional archive data in response to communicating the identified archive data to the remote media access device, based upon stored data identifying a relationship between the additional archive data and the identified archive data.

12. The apparatus of claim 1, wherein the second circuit-based module is configured and arranged to identify archive data by identifying one of at least two sets of archive data for which the same thumbnail image is provided, based upon at least one of: available bandwidth for communicating the archive data, a device type identification of the remote media access device, and a page orientation for providing the identified archive data for access at the remote media access device.

13. An apparatus comprising:
a display;
communication circuitry configured and arranged to communicate over a network;
a first circuit-based module configured and arranged to display same-size interactive thumbnail images received via the communication circuitry over the network, each thumbnail image being linked to at least one of a plurality of media-content units in respective sets of the media-content units and including
a single-page thumbnail image for each media-content unit including a single image-based media content page, the single-page thumbnail image being based upon an image displayed on the single image-based media content page, and
a multi-page thumbnail image for each media-content unit including at least two image-based media content pages, the multi-page thumbnail image being based on an image displayed on at least two of the at least two image-based media content pages; and
a second circuit-based module configured and arranged to, in response to receiving user input data selecting one of the displayed thumbnail images,
identify archive data designated to a media content unit for which the selected thumbnail image is provided, based upon data provided with the thumbnail image, the identified archive data including at least one of images and text for each media content page in the unit,
determine whether the archive data is stored locally at the apparatus,
using the communication circuitry, retrieve the identified archive data that is not stored locally at the apparatus, via the network,
display the identified archive data on the display,
in response to the selected thumbnail image corresponding to a media content unit including a single image-based media content page, display at least one of image data and text data for an entire media content page on the display, and
in response to receiving a local user input for accessing one of the at least two image-based media content pages, display at least one of image data and text data for the entire other one of the at least two image-based media content pages, on the display.

14. The apparatus of claim 13, wherein the second circuit-based module is configured and arranged to display the identified archive data on the display by
in response to the selected thumbnail image corresponding to a media content unit including a single image-based media content page, displaying at least one of image data and text data for an entire media content page on the display.

15. An apparatus comprising:
a display;
communication circuitry configured and arranged to communicate over a network;
a first circuit-based module configured and arranged to display same-size interactive thumbnail images received via the communication circuitry over the network, each thumbnail image being linked to at least one of a plurality of media-content units in respective sets of the media-content units and including
a single-page thumbnail image for each media-content unit including a single image-based media content page, the single-page thumbnail image being based upon an image displayed on the single image-based media content page, and
a multi-page thumbnail image for each media-content unit including at least two image-based media content pages, the multi-page thumbnail image being based on an image displayed on at least two of the at least two image-based media content pages; and
a second circuit-based module configured and arranged to, in response to receiving user input data selecting one of the displayed thumbnail images,
identify archive data designated to a media content unit for which the selected thumbnail image is provided, based upon data provided with the thumbnail image, the identified archive data including at least one of images and text for each media content page in the unit, determine whether the archive data is stored locally at the apparatus, using the communication circuitry, retrieve the identified archive data that is not stored locally at the apparatus, via the network, and display the identified archive data on the display, wherein the second circuit-based module is further configured and arranged to communicate the identified archive data by communicating, over the network, an archive request identifying the identified archive data in response to an input selecting the thumbnail, and by receiving, over the network, the identified archive data from a remote archive data source.

16. An apparatus comprising:

a display;

communication circuitry configured and arranged to communicate over a network;

a first circuit-based module configured and arranged to display same-size interactive thumbnail images received via the communication circuitry over the network, each thumbnail image being linked to at least one of a plurality of media-content units in respective sets of the media-content units and including a single-page thumbnail image for each media-content unit including a single image-based media content page, the single-page thumbnail image being based upon an image displayed on the single image-based media content page, and a multi-page thumbnail image for each media-content unit including at least two image-based media content pages, the multi-page thumbnail image being based on an image displayed on at least two of the at least two image-based media content pages; and a second circuit-based module configured and arranged to, in response to receiving user input data selecting one of the displayed thumbnail images, identify archive data designated to a media content unit for which the selected thumbnail image is provided, based upon data provided with the thumbnail image, the identified archive data including at least one of images and text for each media content page in the unit, determine whether the archive data is stored locally at the apparatus, using the communication circuitry, retrieve the identified archive data that is not stored locally at the apparatus, via the network, and display the identified archive data on the display, wherein the second circuit-based module is further configured and arranged to identify archive data designated to a media content unit for which the selected thumbnail image is provided by using ID data identifying the selected thumbnail image together with stored mapping data that correlates the ID data with at least one archive, and retrieve the identified archive data that is not stored locally at the apparatus by communicating data in the at least one archive over a network to a remote media access device and retrieving the identified archive data therefrom.

17. An apparatus comprising:

a display;

communication circuitry configured and arranged to communicate over a network;

a first circuit-based module configured and arranged to display same-size interactive thumbnail images received via the communication circuitry over the network, each thumbnail image being linked to at least one of a plurality of media-content units in respective sets of the media-content units and including a single-page thumbnail image for each media-content unit including a single image-based media content page, the single-page thumbnail image being based upon an image displayed on the single image-based media content page, and a multi-page thumbnail image for each media-content unit including at least two image-based media content pages, the multi-page thumbnail image being based on an image displayed on at least two of the at least two image-based media content pages; and a second circuit-based module configured and arranged to, in response to receiving user input data selecting one of the displayed thumbnail images, identify archive data designated to a media content unit for which the selected thumbnail image is provided, based upon data provided with the thumbnail image, the identified archive data including at least one of images and text for each media content page in the unit, determine whether the archive data is stored locally at the apparatus, using the communication circuitry, retrieve the identified archive data that is not stored locally at the apparatus, via the network, and display the identified archive data on the display, wherein the second circuit-based module is further configured and arranged to monitor user access to media content pages within archive data and, based upon the monitored access and stored data identifying a relationship between the archive data and additional archive data, automatically retrieve additional archive data via the network.

18. An apparatus comprising:

a first circuit-based module configured and arranged to generate same-size interactive thumbnail images linked to at least one of a plurality of media-content units in respective sets of the media-content units, by generating a single-page thumbnail image for each media-content unit including a single image-based media content page to be displayed at a remote media access device, using an image displayed on the single image-based media content page, and generating a multi-page thumbnail image for each media-content unit including at least two image-based media content pages to be displayed at the remote media access device, using an image displayed on at least two of the at least two image-based media content pages; and a second circuit-based module configured and arranged to communicate the generated thumbnail images over a network for access by remote media access devices, in response to receiving thumbnail selection data via the network and indicating a selected one of the generated thumbnail images, identify archive data designated to a media content unit for which the selected thumbnail image is provided, the identified archive data including at least one of images and text for each media content page in the unit, and communicate the identified archive data over the network for access by the remote media access device from which the thumbnail selection data is received, in response to the identified archive data including archive data that is not stored at the remote media access device.

19. The apparatus of claim 18, wherein the second circuit-based module is configured and arranged to communicate respective sets of archive data by communicating different sets of archive data including information to be displayed on at least one page for each article in a single issue of a digital magazine, separately upon an article-by-article basis.

20. The apparatus of claim 18, wherein the second circuit-based module is configured and arranged to identify archive data designated to a media content unit for which the selected thumbnail image is provided by using ID data identifying the selected thumbnail image together with stored mapping data that correlates the ID data with at least one archive.

21. The apparatus of claim 18, wherein the second circuit-based module is configured and arranged to control access to the respective sets of media content units by communicating the generated thumbnail images over a network for access by remote media access devices, using authentication criteria provided by the remote media access devices and data linking the media content units to the thumbnail images.

22. The apparatus of claim 18, wherein the second circuit-based module is configured and arranged to control the communication of the identified archive data by processing authentication criteria communicated from the remote media access devices with stored authentication data.

23. The apparatus of claim 18, wherein the second circuit-based module is configured and arranged to communicate additional archive data over the network for access by the remote media access device in response to communicating the identified archive data to the remote media access device, based upon stored data identifying a relationship between the additional archive data and the identified archive data.

* * * * *